United States Patent [19]

Hirayama

[11] Patent Number: 4,780,839

[45] Date of Patent: Oct. 25, 1988

[54] ELECTRONIC SCHEDULE DISPLAY APPARATUS

[75] Inventor: Takehiko Hirayama, Tokyo, Japan

[73] Assignee: Casio Computer Co., Ltd., Tokyo, Japan

[21] Appl. No.: 896,623

[22] Filed: Aug. 14, 1986

[30] Foreign Application Priority Data

Aug. 27, 1985 [JP] Japan ............................... 60-187984

[51] Int. Cl.[4] ........................ G06F 3/14; G06F 15/21; G04C 19/00

[52] U.S. Cl. .................................. 364/710.01; 368/82

[58] Field of Search ....................... 364/710, 705, 709; 368/82

[56] References Cited

U.S. PATENT DOCUMENTS 4,274,146 6/1981 Yanagawa ........................... 364/705
4,276,541 6/1981 Inoue et al. ............................. 382/1
4,361,874 11/1982 Yasuda ............................... 364/710
4,362,392 12/1982 Kumata ................................. 368/82
4,654,822 3/1987 Nakanishi et al. .............. 364/705 X

FOREIGN PATENT DOCUMENTS 0119312 9/1984 European Pat. Off. .
2493552 5/1982 France .
653207 12/1985 Switzerland .

OTHER PUBLICATIONS

Mesures Regulation Automatisme, vol. 42, No. 9, Sep. 1977, Paris, FR; C. Piguet et al: "Entree de donnees pour montre multifonctionnelle: Bulletin Annuel Horlogere, vol. 7, No. 4, 1978.

Patents Abstracts of Japan, vol. 5, No. 150 (P-81) [822], Sep. 22, 1981; & JP-A-56 82 480 (daini Seikosha K.K.) 06-07-1981.

Patents Abstracts of Japan, vol. 9, No. 62 (p-342) [1975], Mar. 19, 1985; & JP-A-59 196 494 (Citizen Tokei K.K.) 07-11-1984.

*Primary Examiner*—David H. Malzahn
*Attorney, Agent, or Firm*—Frishauf, Holtz, Goodman & Woodward

[57] ABSTRACT

An electronic schedule display apparatus comprises a key input section for inputting schedule data, the schedule data input by the key input section consisting of day data corresponding to date data, start time data, end time data, and content data of a scheduled event; a schedule data storage section for storing the schedule data input by the key input section, a matrix display device including a large number of optical matrix display elements arranged to correspond to a matrix table of days and times, one optical matrix display element of the matrix display device corresponding to several minutes, and one hour being constituted by the display elements smaller in number than 60, and a schedule time display control section for driving the display elements of the large number of optical matrix display elements of the matrix display device between one corresponding to the start time data of the schedule data stored in the schedule data storage section and one corresponding to the end time data of the schedule data.

16 Claims, 15 Drawing Sheets

ELECTRONIC SCHEDULE DISPLAY APPARATUS

BACKGROUND OF THE INVENTION

This invention relates to an electronic schedule display apparatus which can electronically read/write schedule data, such as date, time, plans and the like.

Conventionally, an electronic schedule display apparatus has been known in the art which stores schedule data, comprised of alarm time data and its corresponding message in a memory, and when the alarm time is reached, display the corresponding message.

For example, U.S. Pat. No. 4,276,541 discloses an electronic schedule display apparatus which, when an alarm time is reached, displays its corresponding message.

In a schedule display apparatus of this type, schedule data is not displayed until the alarm time is reached, resulting in inconvenience. Of course, although stored schedule data can be displayed upon operation of switches, it must be sequentially read out and displayed by those operating switches, resulting in a cumbersome operation.

As described in U.S. Pat. No. 4,274,146, a specific day is displayed on a calender display to indicate that some event is scheduled on that specific day. However, since only the presence/absence of the scheduled event is displayed, the schedule time cannot be confirmed. As a result, an alarm time and a schedule content must be displayed by operating switches. The technique for displaying only the presence/absence of a scheduled event is also disclosed in U.S. patent application Ser. No. 868,301 (May 27, 1986) by the applicant of the present invention.

For a scheduled event (such as for a meeting), not only its starting time but also its ending time are often predetermined. With an apparatus which simply displays the presence of a scheduled event or displays it at an alarm time, however, a time interval from the start to the end of a particular scheduled event cannot be shown.

SUMMARY OF THE INVENTION

The present invention has been made in consideration of the above situation and has as its object to provide an electronic schedule display apparatus which can simultaneoulsy display schedule times for a week and time intervals from starting to ending times of displayed events can be quickly known.

In order to achieve the above object, there is provided an electronic schedule display apparatus comprising:

key input means for inputting schedule data, the schedule data input by said key input means consisting of day data corresponding to date data, start time data, end time data, and content data of a scheduled event, schedule data storage means for storing the schedule data input by said key input means, a matrix display device including a large number of optical matrix display elements arranged to correspond to a matrix table of days and times, one optical matrix display element of said matrix display device corresponding to several minutes, and one hour being constituted by the display elements smaller in number than 60, and schedule time display control means for driving the display elements of the large number of optical matrix display elements of said matrix display device between one corresponding to the start time data of the schedule data stored in said schedule data storage means and one corresponding to the end time data of the schedule data.

According to the electronic schedule display apparatus with the above arrangement of the present invention, since the starting times and the ending times of scheduled events for a week can be simultaneously displayed, the presence/absence of a scheduled event, scheduled time and free time can be immediately known, and when new schedule data is input, free time can be immediately shown, resulting in convenience.

DETAILED DESCRIPTION OF THE PREFERRED EMBODIMENTS

Figure 1:
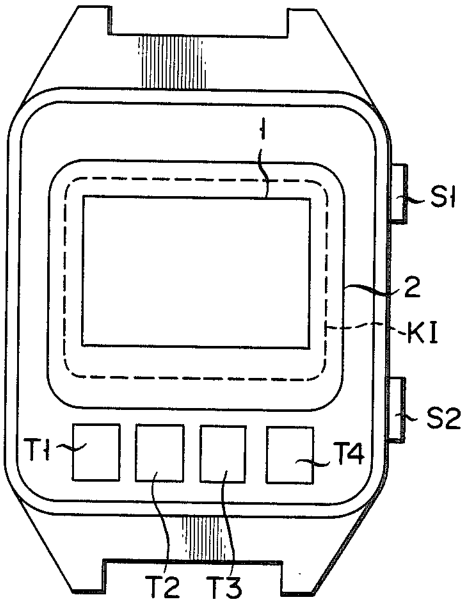
FIG. 1 is a plan view of an electronic wristwatch incorporating an electronic schedule display apparatus of the present invention.

FIG. 1 illustrates an electronic wristwatch incorporating an electronic schedule display apparatus of the present invention. In FIG. 1, reference numeral 1 denotes a display unit comprising a liquid-crystal display device. Section KI has a matrix of electrodes (not shown).

When a user moves his finger on section KI, as if writing a character, the electrodes touched by his finger generate contact capacitance components. These capacitance components are detected, thereby inputting the finger-written character. The apparatus of this embodiment comprises a character recognition device for recognizing a character pattern written on the touch electrodes as an input character. Such a character recognition device is disclosed in U.S. patent application Ser.

No. 561,184 Dec. 14, 1983) by the same applicant of the present invention. Four touch electrodes T1 to T4 are arranged on the lower portion of the upper surface of protection gllass 2 in line at equal intervals. Touch electrodes T1 to T4 serve as schedule time input switches, as will be described in detail. When a finger is slid from touch electrode T1 toward touch electrode T4 or vice versa, a schedule time corresponding to the moving direction and the moving amount can be input. Pushbutton type mode switch S1 and cursor moving switch S2 are arranged at one side portion of a timepiece casing. Each time switch S1 is depressed, a value of mode counter M (to be described later) cyclically changes to be M=0, 1, 2, 3, 0, . . . , as shown in the table below. Different input means is operated in accordance with each different mode determined by the value of M.

| M | Mode Content | Input means |
|---|---|---|
| 0 | Normal state | Input not allowed |
| 1 | Date, start time input | Input by character recognition |
| 2 | End time input | Input in units of 15 min using "+", "−" |
| 3 | Message input | Input by character recognition |

More specifically, "M=0" sets a normal mode, in which any input is inhibited except for time setting. Note that the time setting operation is known to those skilled in the art, and its drawing and description are omitted. "M=1" sets a schedule date and start time input mode, in which a finger-written character by means of character input section KI is recognized, and inputting of the recognized character is allowed. "M=2" sets a schedule end time input mode. In this mode, when a finger is moved along touch electrodes T1 to T4 while touching them, time changes in the "+" or "—" direction in accordance with the moving direction to update the schedule start time, thus allowing inputting of the schedule end time. "M=4" sets a comment data input mode. In this mode, a character is input by means of character input section KI. Cursor moving switch S2 is used in the above-mentioned modes 1, 2, and 3 to sequentially select a set digit by moving a cursor digit by digit and to set input character data to correspond with the selected digit as shown in the table below.

TABLE

| M | CLS 0 | 1 | 2 | 3 | 4 | 5 |
|---|---|---|---|---|---|---|
| 1 | Ten's months | One's months | Ten's days | One's days | Ten's hours | One's hours |
| 2 | End time | | | | | |
| 3 | Message 1st digit | 2nd digit | 3rd digit | . . . | . . . | . . . |

More specifically, in the schedule start date and time input mode (M=1), when switch S2 is operated to set cursor pointer CS (to be described later) to be 0, ten's month data is specified. When switch S2 is further operated to set cursor counter CLS to be 1, setting of one's month data is allowed. Similarly, setting of date and time is allowed upon operation of switch S2. When M=2 and M=3, setting of end time and message data is allowed.

Figure 2:
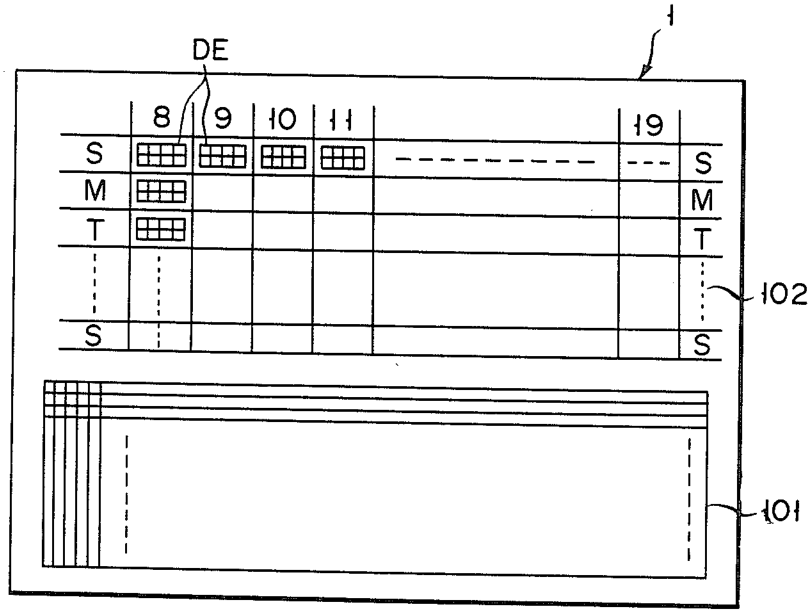
FIG. 2 is a representation showing the configuration of a display section of the electronic wristwatch shown in FIG. 1.

Next, the configuration of display section 1 will be described with reference to FIG. 2. Main matrix display section 101 is arranged on the lower side region of display section 1, and sub matrix display section 102 is arranged on the upper side region thereof. Section 101 digitally displays a normal time, and also displays comment data on schedule data in Japanese or Roman characters. On sub matrix display section 102, day letters (each in one Roman character) corresponding to seven days of a week are printed along the vertical direction, and times from 8:00 to 19:00 are printed in units of hours along the horizontal direction. Ruled lines corresponding to the seven day letters and times from 8:00 to 19:00 are printed, and 2×4 matrix liquid-crystal display elements DE are arranged in a rectangular region defined by the ruled lines.

Figure 3:
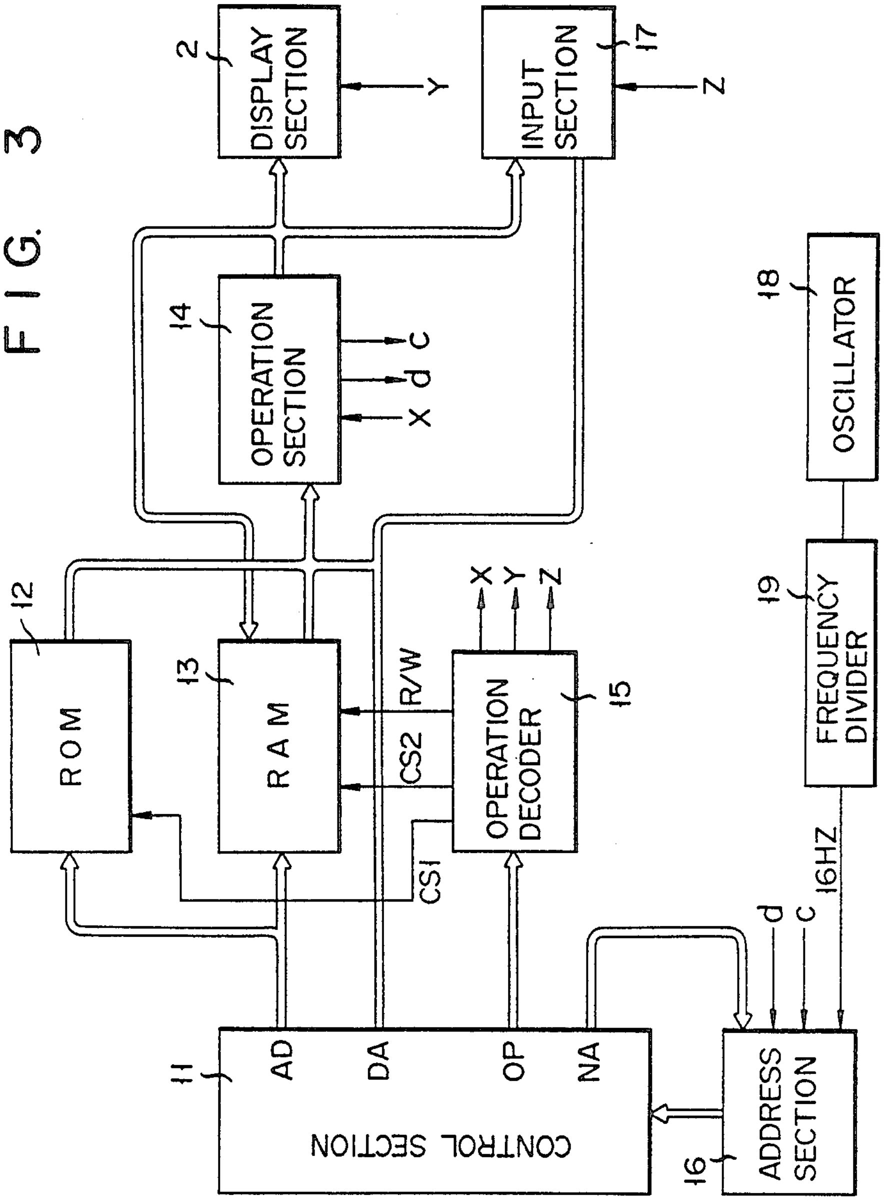
FIG. 3 is a circuit diagram of the electronic wristwatch shown in FIG. 1.

FIG. 3 is a circuit diagram of the electronic wristwatch described above. Control section 11 stores a microprogram for controlling the overall operation of the electronic wristwatch, and parallel-outputs microinstructions AD, DA, OP, and NA. Microinstruction AD is supplied to ROM (Read-Only Memory) 12 and RAM (Random-Access Memory) 13 as address data. Microinstruction DA is supplied to operation section 14 as data. Microinstruction OP is supplied to operation decoder 15, which outputs control signals CS1, CS2, R/W, X, Y, Z, and the like, in response thereto. Microinstruction NA is supplied to address section 16, which outputs address data for reading out microinstructions AD, DA, OP, and NA necessary for the next processing from signals d and c (to be described later) in response thereto, and supplies them to control section 11.

ROM 12 stores standard character pattern data corresponding to Roman characters, which is compared with a character pattern input from input section 17 to recognize an input character. Note that ROM 12 is subjected to data readout operation in response to control signal CS1.

RAM 13 has various registers and is used during various processing operations (e.g., timepiece processing, character recognition processing, and the like) by operation section 14. RAM 13 is subjected to data read/write operation under the control of control signals CS2 and R/W.

Operation section 14 receives input data from input section 17, and executes operation processing under the control of control signal X. The resultant data from section 14 is supplied to input section 17, display section 2, and RAM 13. When section 14 executes a judging operation, it generates signal d indicating the presence/absence of an operation result and signal c indicating the presence/absence of a carry to address section 16.

Of control signals X, Y, and Z from operation decoder 15, signal X is supplied to operation section 14 as an operation instruction, signal Y is supplied to display section 2 as a display instruction, and signal Z is supplied to input section 17 as an input instruction.

A reference clock from oscillator 18 is frequency-divided by frequency divider 19 to obtain a 16-Hz clock, which is input to address section 16. Address section 16 interrupts every 1/16 to of a second and executes timepiece processing in accordance with the 16-Hz clock. In this manner, various operations are executed in response to the microinstructions stored in the ROM in a known manner, as disclosed in U.S. Pat. No. 4,274,146.

Figure 4:
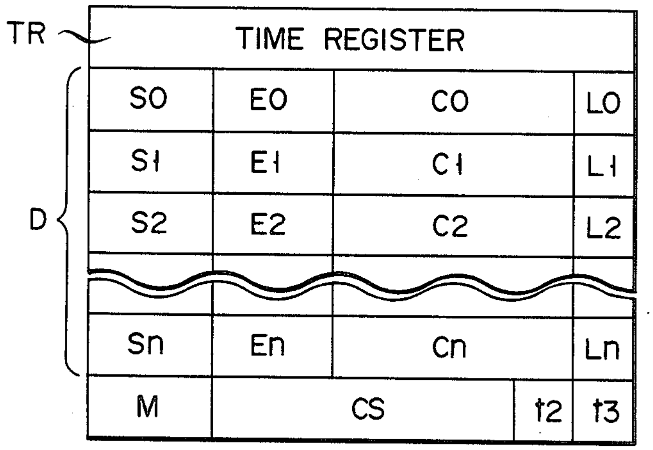
FIG. 4 illustrates a memory region of a RAM shown in FIG. 3.

The major configuration of the memory region of RAM 13 will be described with reference to FIG. 4. RAM 13 has a data memory region which can be accessed by a user and stores time data, system control data, and the like. More specifically, RAM 13 has time register TR for counting and storing a current time and date and data memory D. Schedule data is stored in each line of data memory D. Schedule data consists of schedule time data (the start time and the end time) and comment data indicating the content of a scheduled event. In correspondence with the respective lines, start time data of schedule data is stored in area Sn (n=0, 1, 2 . . . ; n means the same in the following description unless otherwise indicated), end time data is stored in area En, and comment data is stored in area Cn. Area Ln is provided to each line of data memory D, and stores a start flag indicating whether or not the start time is set in the line. The schedule data stored in data memory D is edited after new registration, updating, or additional registration, and is sorted and stored in the order of date. Such a technique for sorting data in the order of date is disclosed in U.S. patent application Ser. No. 868,301 by the applicant of the present invention. In addition, RAM 13 is provided with touch registers t2 and t3 for storing touch flags indicating the presence/absence of a touch operation to correspond to mode counter M, cursor pointer CS, and touch electrodes T2 and T3.

Figure 5A:
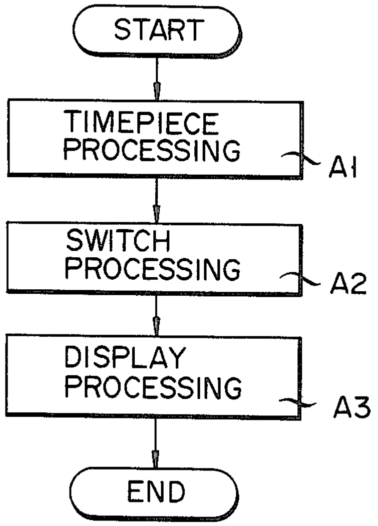
FIG. 5A is a general flow chart of the circuit shown in FIG. 3.

The operation of the electronic wristwatch will now be described with reference to FIGS. 5 to 8. First, the overall operation of the electronic wristwatch will be described schematically with reference to the general flow chart of FIG. 5A. The flow of FIG. 5A is executed each time a 16-Hz clock is generated from frequency divider 19, i.e., every 1/16 seconds. When the 16-Hz timepiece timing is reached, timepiece processing is executed in step A1. More specifically, 1/16-sec data is added to the timepiece data stored in time register TR in RAM 13 to update a current time, and is transferred to RAM 13 to be stored therein as new current time data. After the timepiece processing, the flow advances to step A2. If it is detected in step A2 that any switch (including touch electrodes) is operated, switch processing corresponding to the operated switch is designated and executed. In step A3, display processing associated with the timepiece processing or switch processing is executed.

Figure 6:
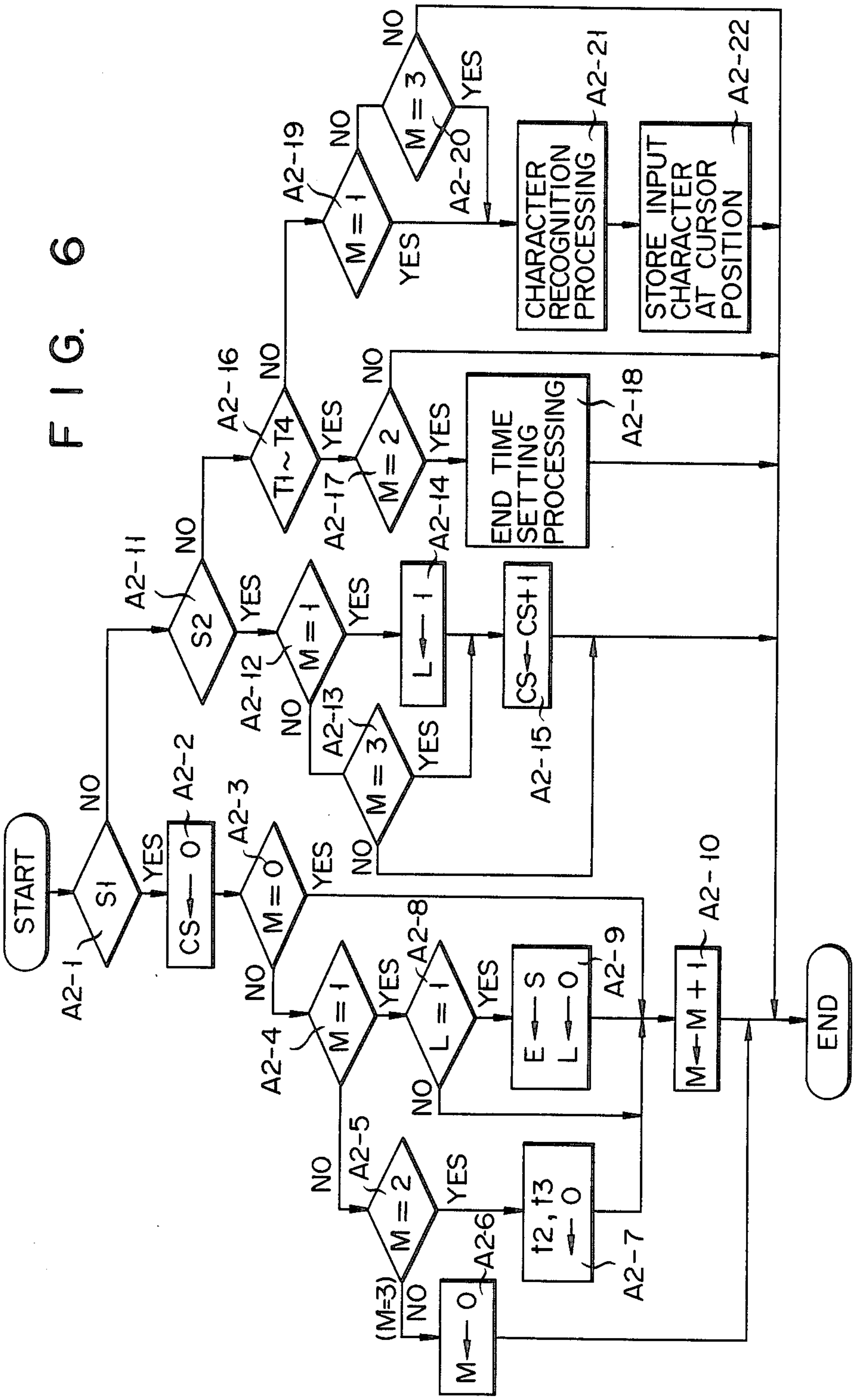
FIG. 6 is a flow chart showing switch processing shown in FIG. 5A.

FIG. 6 is a detailed flow chart of the switch processing in step A2 of FIG. 5A. In this flow, it is checked in step A2-1 if mode switch S1 is operated. Mode switch S1 updates the value of mode counter M by +1 each time it is operated. If YES in step A2-1, cursor point CS is cleard in step A2-2. Therefore, each time mode switch S1 is operated, the value of cursor pointer CS is cleared. Therefore, the 0th digit position is always selected when a new mode is selected. Then, it is checked whether value M of mode switch S1 is 0 (step A2-3), 1 (step A2-4), or 2 (step A2-5). Assuming that mode switch S1 is operated in the "M=3" mode, this is detected in step A2-5, and the flow advances to step A2-6 to clear the value of mode counter M to "0". More specifically, when mode switch S1 is depressed once in the "M=3" mode, the mode is returned to M'0. If cursor moving switch S2 is operated in the "M=0" mode, i.e., in the normal mode, this is detected in step A2-11. The flow then advances to step A2-12 to check if the "M=1" mode is selected, and then to step A2-13 to check if the "M=3" mode is selected. However, since the "M=0" mode is selected, the operation of cursor moving switch S2 is made invalid. Assuming that a finger touches touch electrodes T1 to T4 to effect a touch input, this is detected in step A2-16, and the flow advances to step A2-17 to check if the "M=2" mode is selected. Since the "M=0" mode is now selected, the touch input from touch electrodes T1 to T4 is made invalid. Assuming that a finger touches the touch electrodes of character input section KI, the flow advances from step A2-16 to step A2-19 to check if the "M=1" mode is selected and then to step A2-20 to check if the "M=3" mode is selected. However, since the "M=0" mode is now selected, the touch input from the touch electrodes of character input section KI is invalid. Therefore, in the "M=0" normal mode, any input is inhibited. The display state in the normal mode is as shown in FIG. 8A. More specifically, date data (6–10), day data (SUN), and time data (9 35′ 41″ AM) of the time data are digitally displayed on main matrix display section 101 of display section 1. On sub matrix display section 102, a bar display having a length corresponding to a duration from the start time to the end time of preset schedule data is illuminated in the area corresponding to the day and time of the schedule data. Thus, for example, it can be quickly understood that a schedule time on Monday is from 10:00 to 11:15.

Figure 5B:
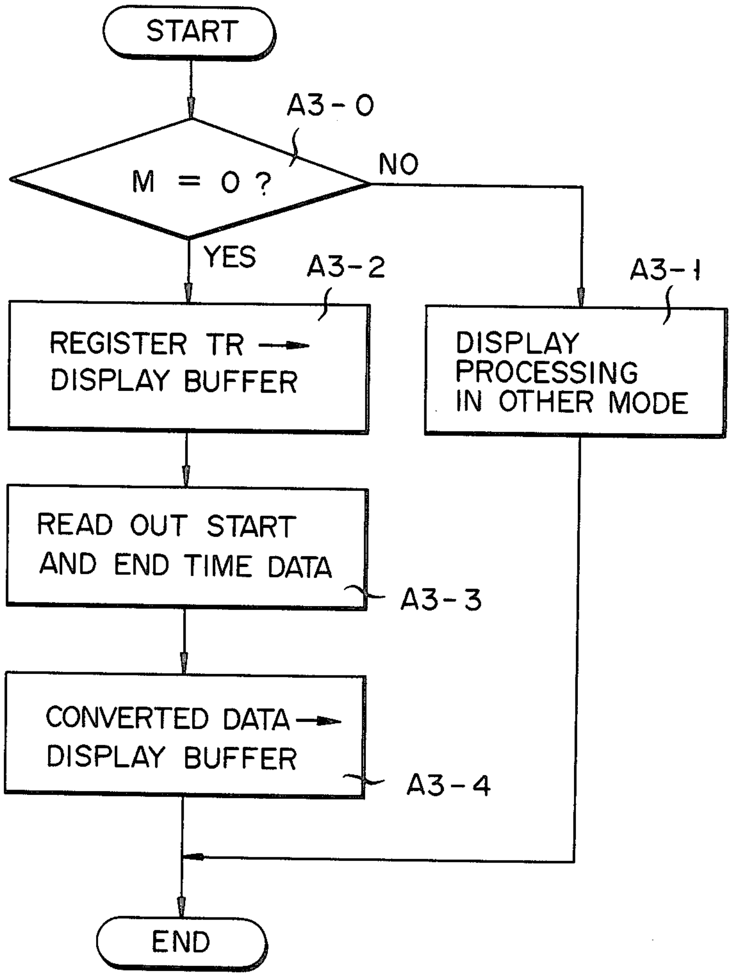
FIG. 5B is a detailed flow chart showing display processing of the flow chart of FIG. 5A.

The display processing as above is executed in step A3 in FIG. 5A. FIG. 5B shows display step A3 in detail.

It is first checked in step A3-0 if M=0. If NO in step A3-0, discrimination of other modes and display processing are performed in step A3-1. If YES in step A3-0, i.e., if M=0, the current content of time register TR in RAM 13 is sent to a display buffer (not shown) of display section 1 and the current time is displayed. In addition, in step A3-3, schedule data is read out. The readout schedule data is assigned to each day of the week in step A3-4, and is converted to data for driving all the display elements corresponding to the duration from the start time to the end time for each scheduled event. The data is supplied to the display buffer and the schedule data is bar-displayed.

In the normal mode, when mode switch S1 is depressed once, the flow advances from step A2-3 to A2-10, and mode conversion is performed by incrementing the value of mode counter M by +1. As a result, the value of mode counter M is "1", i.e., the start time data input mode is set. When the mode is switched, since the content of cursor pointer CS is "0", the 0th digit position is initially selected. Therefore, when ten's month data is input while touching the touch electrodes of character input section KI with a finger, the flow advances from step A2-19 to step A2-21, and the input character pattern is compared with the standard character pattern stored in ROM 12, so that the recognized input character is stored at a digit position in data memory D corresponding to the cursor position. After the ten's month data is set, cursor moving switch S2 is operated once. Then, the flow advances from step A2-11 to A2-12. Since the "M=1" mode is now selected, start flag "1" is set in area L in step A2-14. More specifically, the fact that switch S2 is operated in the "M=1" mode to select the digit position means that at least the ten's month data is preset. Therefore, the start flag is set upon operation of switch S2. Next, the flow advances to step A2-15, and the value of cursor point CS is incremented by +1. In this case, the value of cursor pointer CS is "1". When one's month data is input in this case, the input data is recognized and is stored at the corresponding digit position in data memory D. When the start time data is input from the ten's month digit to one's minute digit in this manner, the schedule start data is stored in area Sn of data memory D. FIG. 8B shows the display state of start time data setting. On main matrix display section 101, currently hand-written start time data "6-15 10:30" is digitally displayed, and a symbol display "TIME?" indicating the start time data input mode is also displayed. In addition, the final digit selection position (one's minute digit) is flashed to display cursor. On sub matrix display section 102, dot display segments of display elements DE corresponding too the set start time are flashed. More specifically, display elements DE are constituted by 2 rows×4 columns dot display segments for one hour, as shown in FIG. 2, and one column indicates 15 minutes. Thus, the start time is flash-displayed using the upper and lower rows of dots corresponding to the time. In the start time data input mode, when mode switch S1 is depressed once, the flow advances from step A2-4 to step A2-8 to check if start flag "1" is set in area L.

Since the start time data is set, the start flag in area L is "1". Therefore, the flow advances to step A2-9 when the start time data input mode is switched to the end time data input mode. In step A2-9, the start time data in area S is transferred to the corresponding area E, and is used as end time data. In addition, start flag in area L is cleared. Thereafter, the value of mode counter M is incremented in step A2-10 to set the end time data input mode (M=2). FIG. 8C shows the display state when the start time data input mode is switched to the end time data input mode. On display section 101, start time data "6-15 10:30" is displayed and "10:30" is also displayed as the end time. In this case, the entire end time is flashed, and symbol "END-TIME" indicating the end time data input mode is displayed on display section 101. In this state, a finger is moved in a direction from touch electrode T1 to touch electrode T4 ("+" direction) or vice versa ("−" direction) while touching them. In step A2-16, the touch input of electrodes T1 to T4 is detected, and the flow then advances from step A2-17 to step A2-18, thus executing end time setting processing.

Figure 7:
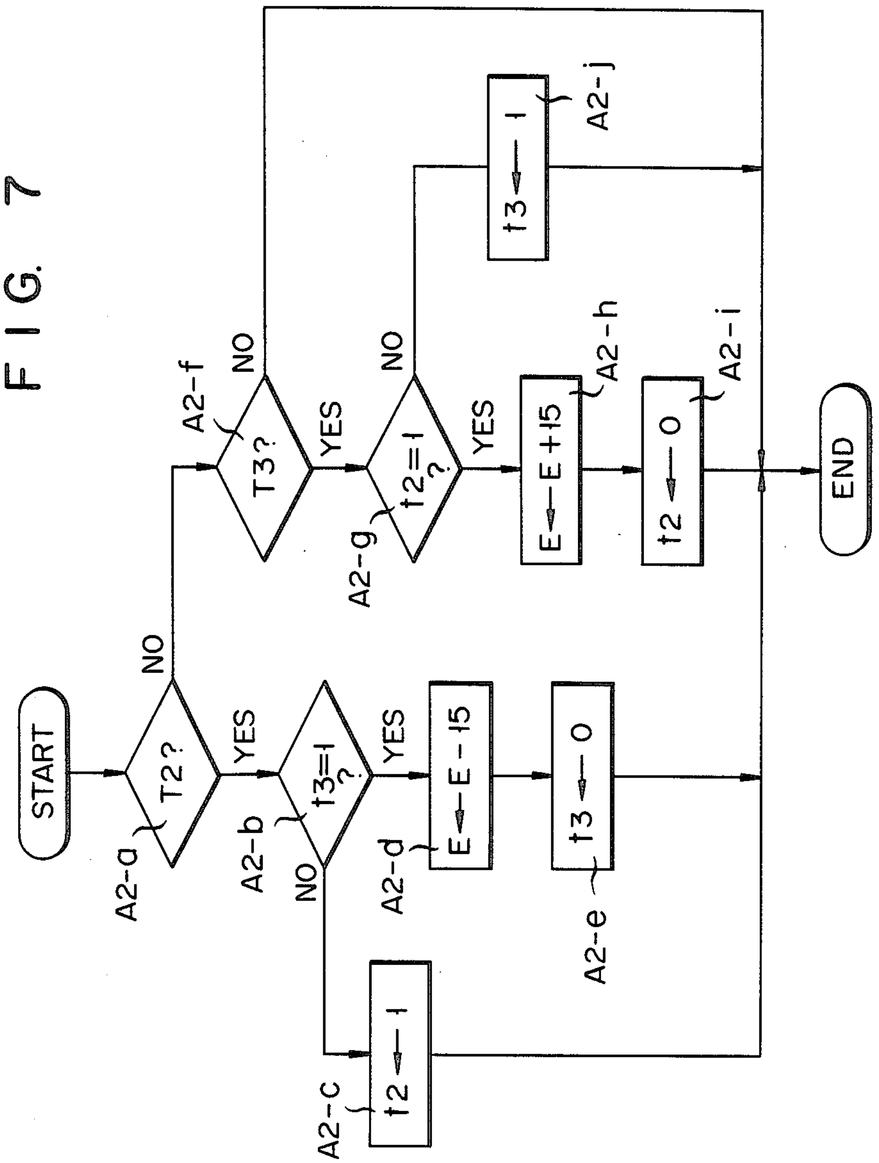
FIG. 7 is a detailed flow chart of end time setting processing shown in the flow chart of FIG. 6.
Figure 8:
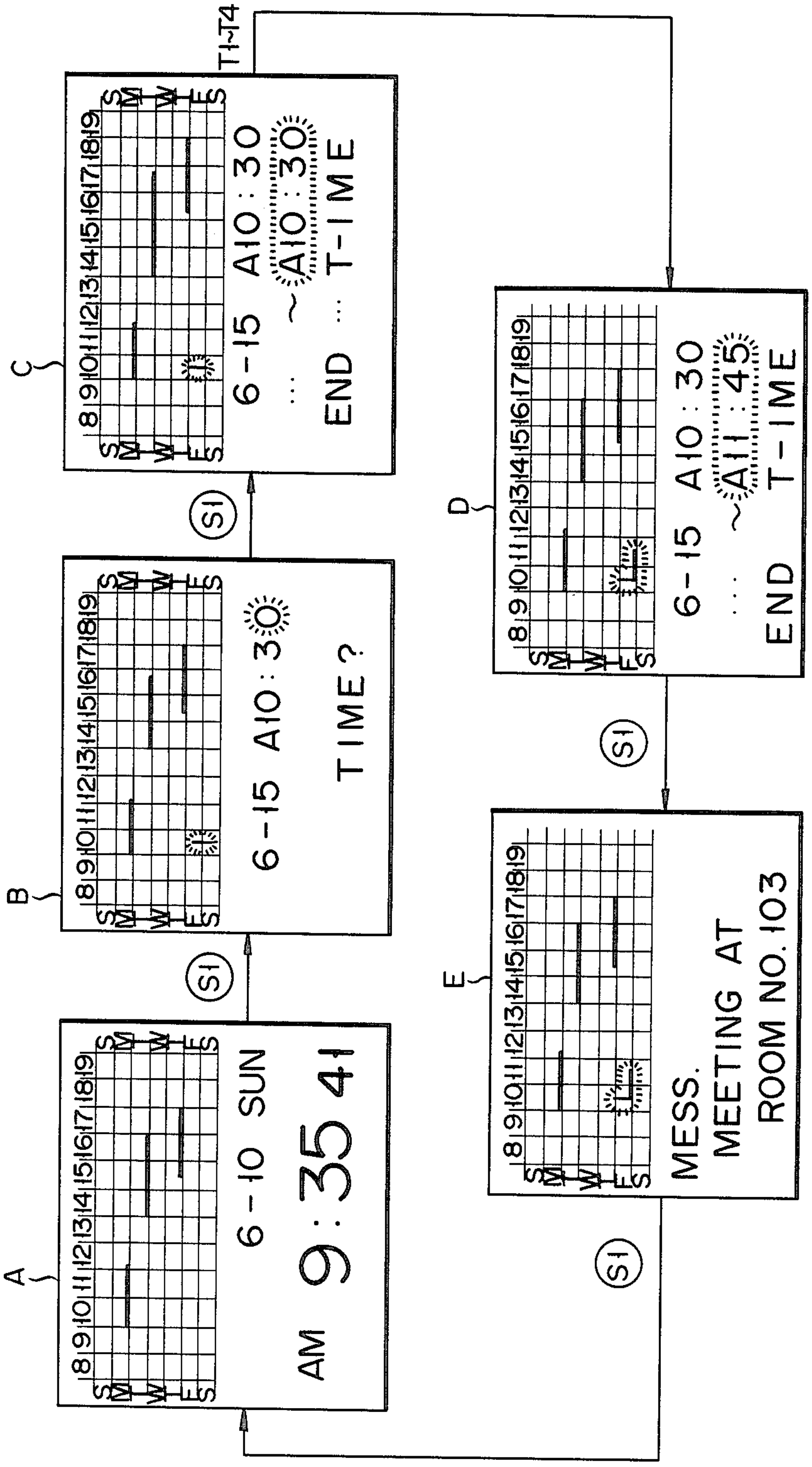
FIG. 8 is an illustratin showing a change in display states upon operation of switches.

FIG. 7 is a detailed flow chart of the end time setting processing in step A2-18 of FIG. 6. The presence/absence of the touch input is checked in step A2-a. Assuming that a finger touches touch electrode T2 in operation from electrode T1 to electrode T4 or vice versa, the flow advances to step A2-b. In step A2-b, it is checked if the content of touch register t3 is "1", i.e., if touch electrode T3 was touched first. If the content of touch register t3 is "0" (touch electrode T3 is not yet touched), the flow advances to step A2-c, and flag "1" indicating the presence of touch inpu is set in touch register t2. However, if the touched electrode is not T2 in step A2-a, the presence/absence of the touch input on electrode T3 is checked in step A2-f. If it is detected that touch electrode T3 is touched, it is checked in step A2-g if the content of touch register t2 is "1". If electrode T2 was touched before electrode T3, i.e., if a finger is moved from electrode T2 to T3 ("+" direction), "1" is set in register t2 in step A2-c described above. As a result, in steps A2-f and A2-g, it can be detected that a finger is moved in the "+" direction from electrode T2 to electrode T3. In this manner, when finger movement from electrode T2 to electrode T3 is detected, the flow advances to step A2-h, and the end time data in area E is updated by +15 minutes. Next, the content of touch register t2 is cleared. If it is detected in step A2-f that a touch input of electrode T3 is present and if it is also detected that the content of register t2 is "0" and electrode T2 is not touched before electrode T3, i.e., if movement from electrode T2 to electrode T3 is not detected, the flow advances to step A2-j. Then, "1" indicating that electrode T3 is touched is set in register t3. On the other hand, if it is detected in step A2-a that electrode T2 is touched and it is detected in step A2-b that "1" is set in register t3, this means a finger is moved from electrode T3 to electrode T2. For this reason, in steps A2-a and A2-b, it can be detected that the finger is moved from electrode T3 to electrode T2. In this manner, when finger movement from electrode T3 to electrode T2 is detected, the flow advances to step A2-d, and the end time data in area E is decremented by −15 minutes. In step A2-e, the content of register t3 is cleared. In this manner, in the end time setting processing, the transferred start time data is incremented or decremented by 15 minutes in accordance with movement of a finger from electrode T1 to electrode T4 or vice versa to set the end time data. In accordance with the set end time data, flashing display of display elements DE (indicating schedule time subjected to a setting operation) is prolonged or shortened. FIG. 8D shows a display state wherein touch electrodes are touched five times in the "+" direction from electrode T1 to electrode T4 from the state shown in FIG. 8C. In this case, the end time data is updated from "10:30" to "11:45", and the flashing display is prolonged accordingly to display a bar corresponding to the duration from the schedule start time to the end time. In this case, only the lower row of dot display segments is used for display other than display of the start time. If end time data is erroneously set to be "12:00" instead of "11:45", touch electrodes T1 to T4 can be touched once from electrode T4 to T1 to decrement the end time data by −15 minutes, thus allowing easy correction.

Referring again to the flow chart in FIG. 6, the "M=3" mode will be described below. In order to input comment data, switch S1 is depressed once in the end time data input mode. The flow advances from step A2-5 to A2-7. After registers t2 and t3 are cleared, the value of counter M is incremented by +1 to be M=3 to set the comment data input mode. In the comment data input mode, since the value of cursor pointer CS is initially set to be "0", when a character at the first digit position is finger-written on character input section KI, it is recognized in step A2-21, and is stored at a digit position corresponding to the cursor position as first digit data. Then, switch S2 is operated to increment the value of cursor pointer CS by +1, and the next character is input. In this manner, since the sequentially input characters are stored in comment storage region Co of data memory D, comment data is automatically set to correspond to start and end times. FIG. 8E illustrates this display state, and the input comment data is displayed on display section 101. When mode switch S1 is operated once from the comment data input mode, since the content of mode counter M is cleared, the display state is returned to that shown in FIG. 8A.

In this manner, according to this embodiment, a matrix display section, in which dates and times are plotted along its vertical and horizontal directions, respectively, is provided, and date data, start time data, and end time data of prestored schedule data are read out to be displayed in a corresponding display area of the matrix display section in an analog manner. Therefore, for example, schedule times for a week can be displayed on a single screen, and a duration from the schedule start time to the end time of each scheduled event for that week can be visually and quickly confirmed.

Another embodiment of the present invention will be described hereinafter with reference to FIGS. 9 to 16.

Figure 9:
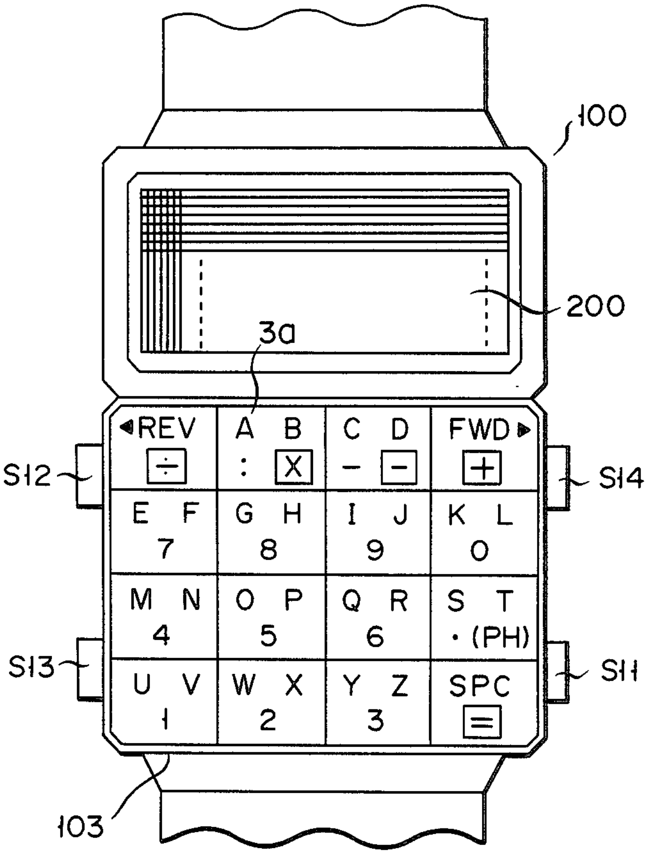
FIG. 9 is a plan view of an electronic wristwatch incorporating an electronic schedule display apparatus according to another embodiment of the present invention.

FIG. 9 is a plan view of an electronic wristwatch of this embodiment. Referring to FIG. 9, timepiece casing 100 comprises display section 200 (e.g., a liquid-crystal display device) for various displays, key switches S11 to S14, and ten-key switch group 103. Display section 200 is a display device capable of displaying alphabetical characters, numerals, symbols, and the like in units of dots (e.g., 16×48 dots). As a matter of course, display section 200 can perform matrix display of days and times, as in sub matrix display section 102 shown in FIG. 2. For this purpose, although not shown, day letters, time characters, ruled lines, and the like are printed at a density low enough not to interfere with the display when alphabetical characters or numerals are displayed. Key switch S12 is a cursor left-shift switch having a function for moving a cursor position to the left during a character input operation. Key switch S14 is a cursor right-shift switch having a function for moving the cursor position in the direction (right) opposite to that of switch S12. Key switch S13 has a function for sequentially switching display modes, i.e., a basic time display mode and a function menu display mode. Ten-key switch group 103 is used to input alphabetical characters, numerals, symbols, and the like. For example, when data input ten-key switch 3*a* is depressed once, "A" is input at a cursor position on display section 200; when depressed twice, "B" is input; when depressed three times, ":" is input; and when depressed four times, "x" is input. Note that key switch S11 will be described later in detail.

Figure 10:
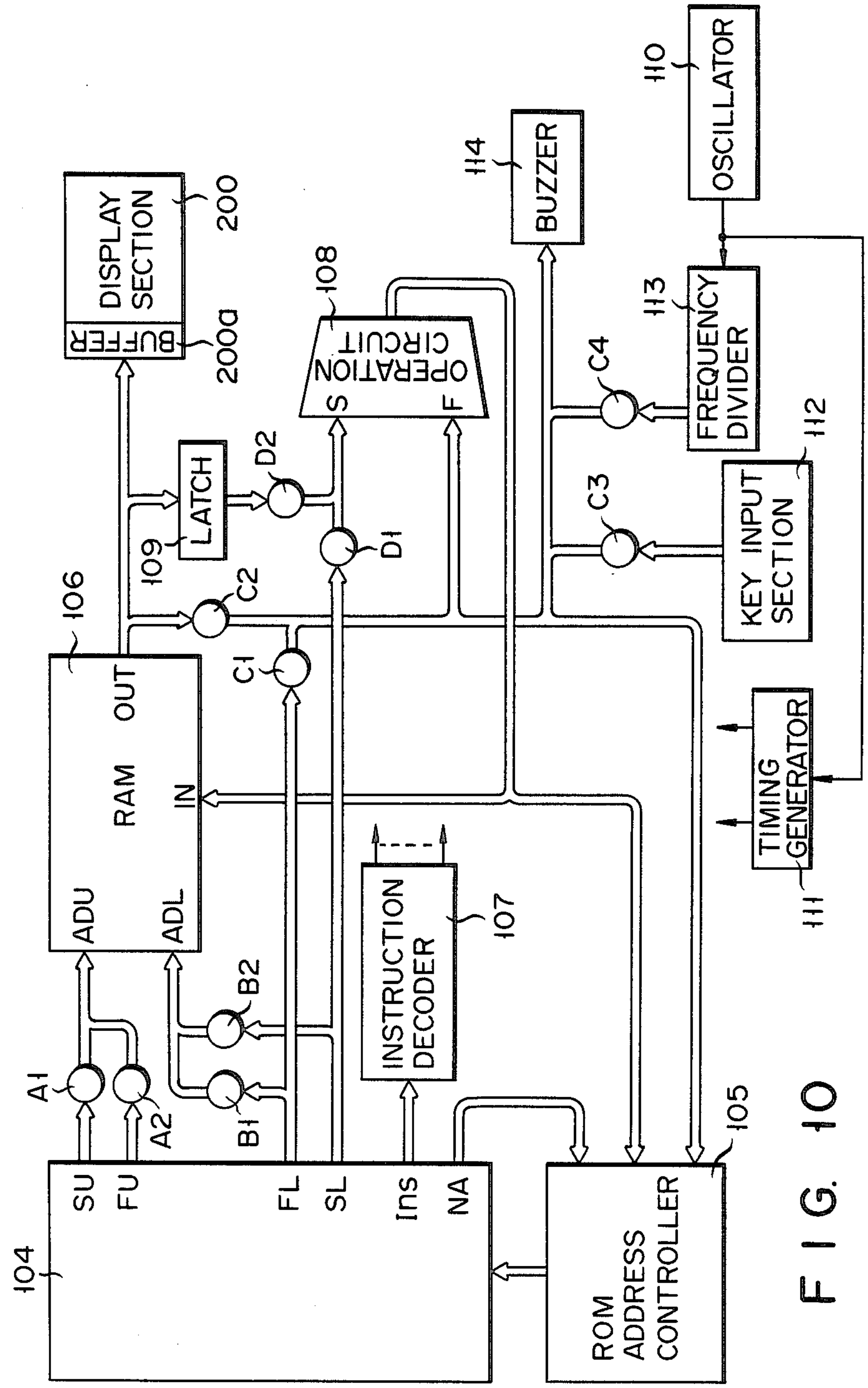
FIG. 10 is a circuit diagram of the electronic wristwatch shown in FIG. 9.

FIG. 10 is a block diagram showing an internal circuit of the electronic wristwatch of this embodiment. Referring to FIG. 10, ROM 104 is a fixed memory incorporating a control program and data for controlling the entire system. ROM address controller 105 is a function block for controlling addresses of ROM 104 which define the flow of a program, and receives output NA for specifying the next address of ROM 104, an output from operation circuit 108, and an output from frequency divider 113 (to be described later). RAM 106 outputs data at addresses specified by address data outputs SU, SL, FU, and FL of ROM 104, and receives and stores data processed by operation circuit 108. Instruction decoder 107 is a function block for decoding instruction outputs INS from ROM 104 and sending a control signal to the respective function blocks. Operation circuit 108 performs a logic operation upon reception of inputs S and F, and writes its output at an address on RAM 106 specified by outputs FU and FL from ROM 104. Latch 109 temporarily stores the content of RAM 106 at an address specified by outputs SU and SL of ROM 104, and supplies it to input S of operation circuit 108 in synchronism with the other input F thereof.

Oscillator 110 generates a clock signal having a constant interval, and timing generator 111 frequency-divides the clock signal to a predetermined frequency and generates a timing signal for time-serially controlling the respective function blocks. Key input section 112 is a function block for supplying a signal for instruction various processing operations to the system, and includes key switches S11 to S114 and ten-key switch group 103 for inputting data, as shown in FIG. 9. Frequency divider 113 is a counter for frequency dividing an output from oscillator 110, and produces a clock signal having a constant interval. The clock signal is used for timepiece processing, as will be described later.

Display section 200 is a function block for displaying processed data through display buffer 102*a*, and is the same as that shown in FIG. 9. Buzzer 114 is a function block for generating an alarm sound based on data sent through a bus line. Bus control gates A1, A2, B1, B2, C1 to C4, D1, and D2 control data flow in bus lines based on an output signal from instruction decoder 107.

Figure 11:
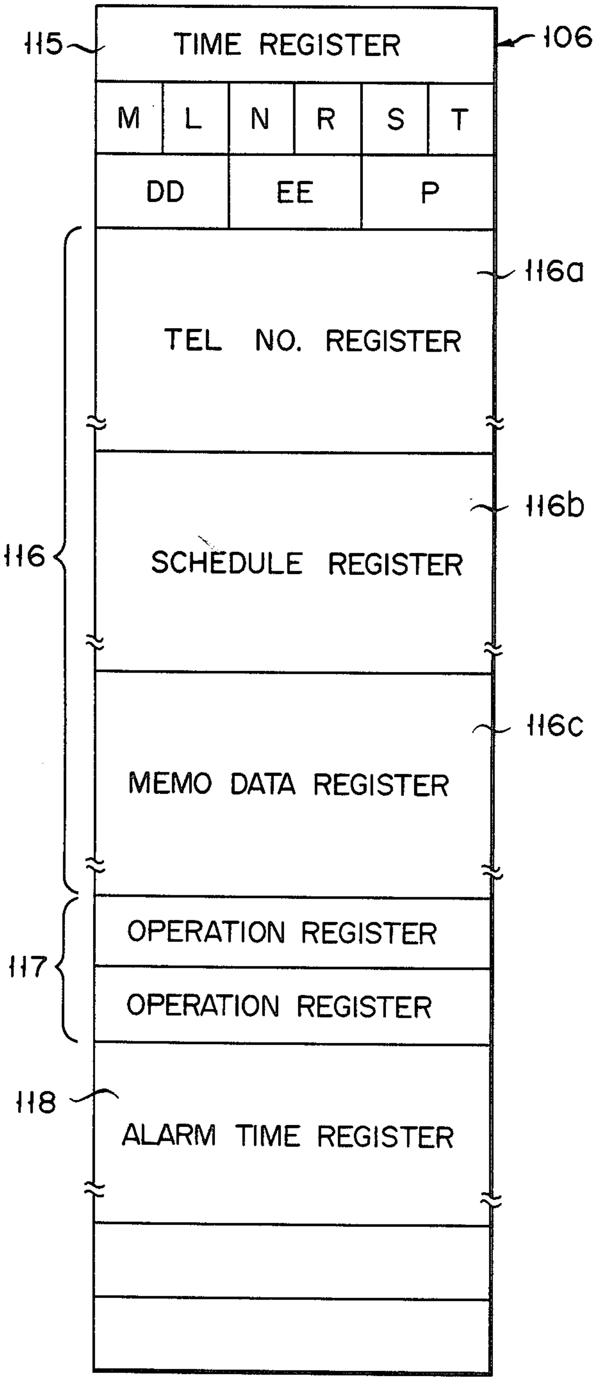
FIG. 11 illustrates a memory region of a RAM shown in FIG. 10.

FIG. 11 shows the main internal arrangement of the memory region of RAM 106. Referring to FIG. 11, time register 115 stores current date data (year, month, day, and the like) and time data (hours, minutes, seconds and the like).

Data register 116 comprises register 116*a* for storing a large number of telephone numbers, register 116*b* for storing schedule data, register 116*c* for storing regular memo data, and the like.

Operation register 117 is used for temporary storage during operation processing.

Alarm time register 118 stores alarm time data.

Mode flag M stores a value varying from 0 to 4 corresponding to various display modes (basic time display mode, menu 1 display mode, menu 2 display mode, menu 3 display mode, and menu 4 display mode). Reference symbols L, N, R, S, and T denote flags which are used in, e.g., a selective display mode (to be described later) and store values corresponding to modes. Reference symbol DD denotes a register for storing date data; EE, a register for storing day data, i.e., values varying from 0 to 6 corresponding to Sunday to Saturday; and P, an address pointer for date data.

Figure 12:
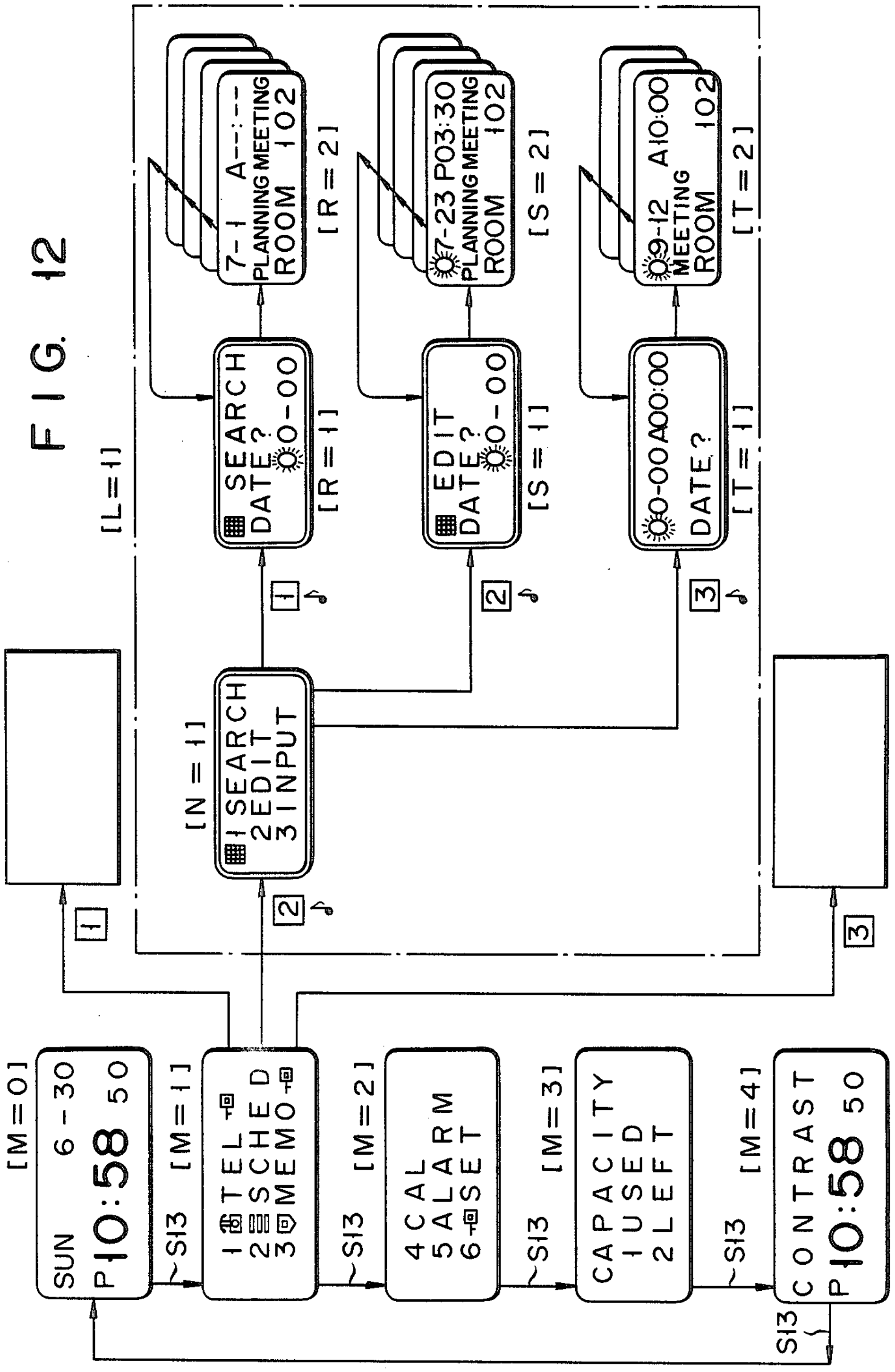
FIGS. 12 and 13 are illustrations showing a change in display states upon operation of switches.
Figure 13:
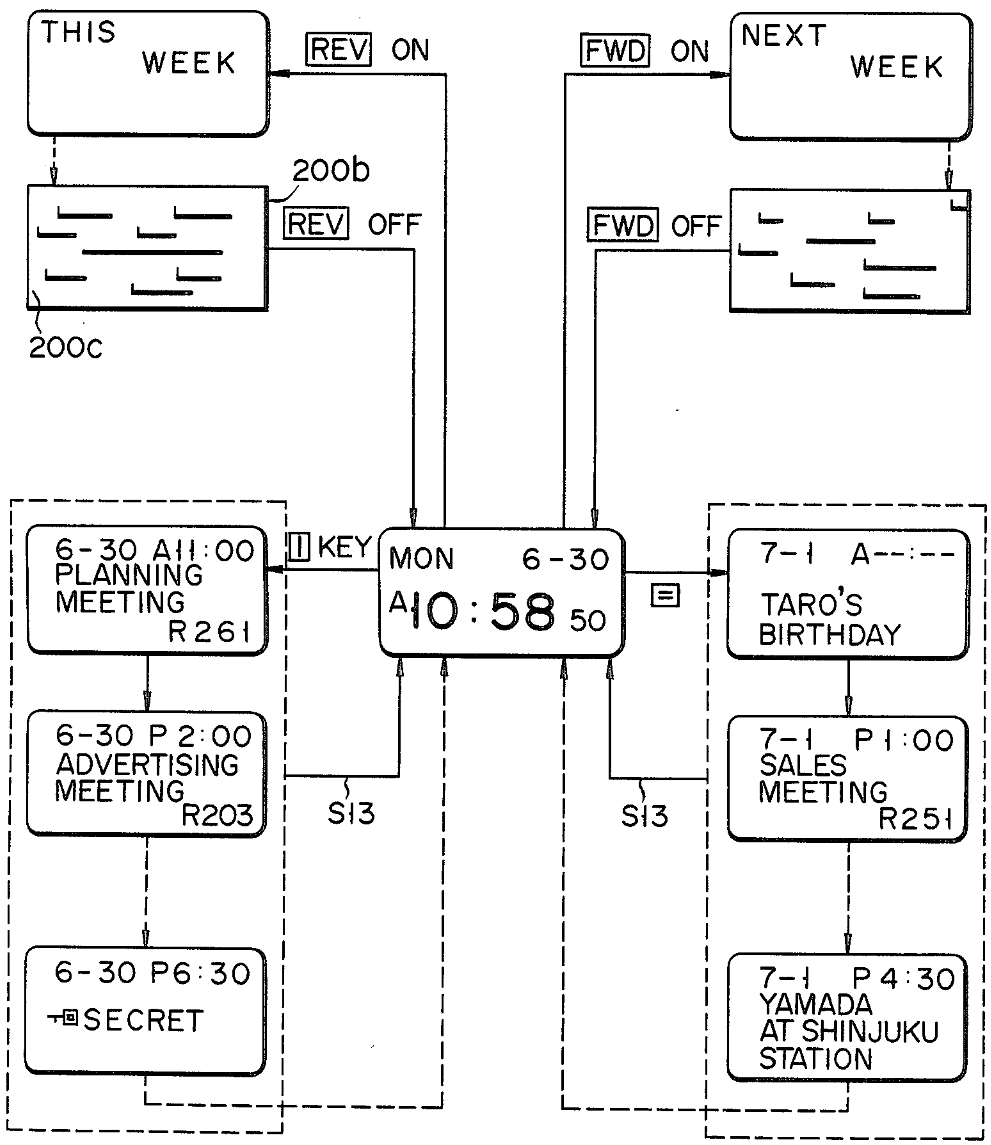

FIGS. 12 and 13 show various display states of display section 200 and values of the respective flags based on the operation of key switches S11 to S14 and ten-key switch group 103 for inputting data. The display operation of this embodiment will be briefly described with reference to FIGS. 12 and 13.

Referring to FIG. 12, in the basic time display mode (M=0) for displaying a normal time, each time key switch S13 is operated, the display mode is switched sequentially to the menu 1 display mode (M=1), the menu 2 display mode (M=2), the menu 3 display mode (M=3), and menu 4 display mode (M=4), and then returns to the basic time display mode (M=0).

In the menu 1 display mode (M=1), "telephone number memo mode" (1 TEL), "schedule memo mode" (2 SCHED), and "regular memo mode" (3 MEMO) are displayed in upper, middle, and lower rows of display section 200. When the corresponding one of data input switches "1", "2", and "3" of ten-key switch group 103 is depressed, a memo mode corresponding to the selected number is selected. In the memo 2 display mode (M=2), "calender mode" (4 CAL), "alarm mode" (5 ALARM), and "set mode" (6 SET) are similarly displayed, and a desired mode can be selected by operating one of switches "4", "5", and "6" of ten-key switch group 103. In the menu 3 display mode (M=3), "data capacity mode" (CAPACITY), "used capacity mode" (1 USED), and "left capacity mode" (2 LEFT) are displayed and one is selected and displayed by using one of switches "1" and "2" of switch group 103. In the menu 4 display mode (M=4), a display contrast (CONTRAST) of display section 200 can be adjusted.

In the menu 1 display mode (M=1), when the "2" key is depressed, the schedule memo (2 SCHED) is selected, and items, i.e., "data search" (1 SEARCH), "data edit" (2 EDIT), and "data input" (3 INPUT) are displayed. In this state, when the "1" key is depressed, "1" is set in flag R in RAM 106, and a date search mode (SEARCH DATE?) is displayed and data input is requested. When search date data is input, schedule data corresponding to the input date data, e.g., "7-23 P3:30 PLANNING MEETING AT ROOM 102", is displayed. When the "2" key is depressed, "1" is set in flag S, and an edit mode (EDIT DATE?) is displayed and data input is requested. When date data to be edited is input for the flashing portion, schedule data corresponding to the input date data is read out, thus allowing editing. When the "3" key is depressed, "1" is set in flag T and a data input mode (DATE?) is displayed. Thus, new data (in this embodiment, "9-12 A10:00 MEETING AT RECEPTION ROOM") can be input.

When the ten keys are sequentially operated from the menu 1 display mode, a desired display mode can be reached. When the "1" or "3" key is depressed in the menu 1 display mode, telephone number data or memo data can be displayed by sequentially operating the ten keys in the same manner as described above.

In the menu 2 display mode (M=2), when the "4", "5", or "6" key is depressed, a calculation mode, an alarm mode (setting of alarm time data), and a secret code setting mode can be switched.

Switch S11 is a switch for restoring the immediately preceding display mode. For example, when switch S11 is depressed once in the "R=2" display mode, the mode returns to the "R=1" display mode, and when switch S11 is further depressed, it returns to the "N=1" display mode. In the "S=2" and "T=2" display modes, when switch S11 is operated, the mode returns to the "S=1" and "T=1" display modes, respectively. In these modes, the mode returns to the "N=1" display mode upon operation of switch S11.

In this manner, switch S11 is predetermined as a switch for restoring the previous display mode, resulting in high operability.

In the basic time display mode (M=0), schedule data for today/tomorrow and this week/next week can be easily displayed using ten-key switch group 103, as shown in FIG. 13. For schedule data for today, as soon as the "1" key is depressed and released, each today's data in schedule register **116*b* is automatically switched and displayed for every 2 seconds. Display section 200 displays date data, start and end time data (hour, minute) in its upper row, and a message up to 16 characters consisting of alphabetical characters, numerals, and symbols in its middle and lower rows. At this time, when a specific today's data is to be checked closely, data is continuously displayed while the "1" key is continuously depressed. When the "1" key is released, subsequent data is automatically switched and displayed. After the last schedule data is displayed, the display mode returns to the basic time display mode. When this mode is to be interrupted and canceled, the display mode can be returned to the basic time display mode (M=0) by depressing switch S13. For setting data as secret data, date data, start time data, and the like are displayed. However, message memo data is not displayed, and "SECRET" is simply displayed. Schedule data for tomorrow in schedule register 116*b* can be automatically switched and displayed for every 2 seconds as soon as a "=" key is depressed and released. The display states on display section 200 and the operation of cancel switch S13** are the same as those for displaying today's data.

Next, when switch "REV" is depressed, "THIS WEEK" is first displayed on display section 200 and, after the lapse of 1 to 2 seconds, schedule data for this week in schedule register **116*b* is automatically displayed in the form of a table. This table displays schedule data set for a week in units of 15 minutes (12 hours for each day). On display section 200, schedule data for a week is displayed using each row for one day by means of marks in units of 15 minutes (one dot), and the total length of the marks indicates a schedule duration. The form of this table display is the same as that of sub matrix display section 102 shown in FIG. 2. When schedule data is set to fall outside a display range (before 8:00 AM or after 8:00 PM), corresponding columns at two ends indicated by reference numerals 200*b* and 200*c*** are illuminated. When different schedule data are set within an identical time range, they are displayed by their sum (OR) data. Since marks are displayed in units of 15 minutes, any remainder obtained by dividing time data by 15 minutes is rounded off for a start time and is rounded up for an end time on the table display. For example, when the start time is 2:12, it is rounded off and is displayed as "2:00". When the end time is 2:48, it is rounded up and is displayed as "3:00". More specifically, one displayed segment indicates any of 00' to 14', 15' to 29', 30' to 44', and 45' to 59' for the start time, and indicates any of 01' to 15', 16' to 30', 31' to 45', and 46' to 00' for the end time. The table display is provided while switch "REV" is continuously turned on, and when the switch is turned off, it is returned to the basic time display mode (M=0).

Next, when switch "FWD" is depressed, "NEXT WEEK" is first displayed on display section 200 and, after the lapse of 1 to 2 seconds, schedule data for the next week in schedule register **116*b* is automatically displayed in the form of a table. The display states of display section 200** and the operation of switch FWD are the same as those for displaying data for this week.

The detailed processing operation for enabling the above-mentioned display will be described with reference to FIGS. 14 to 16.

Figure 14:
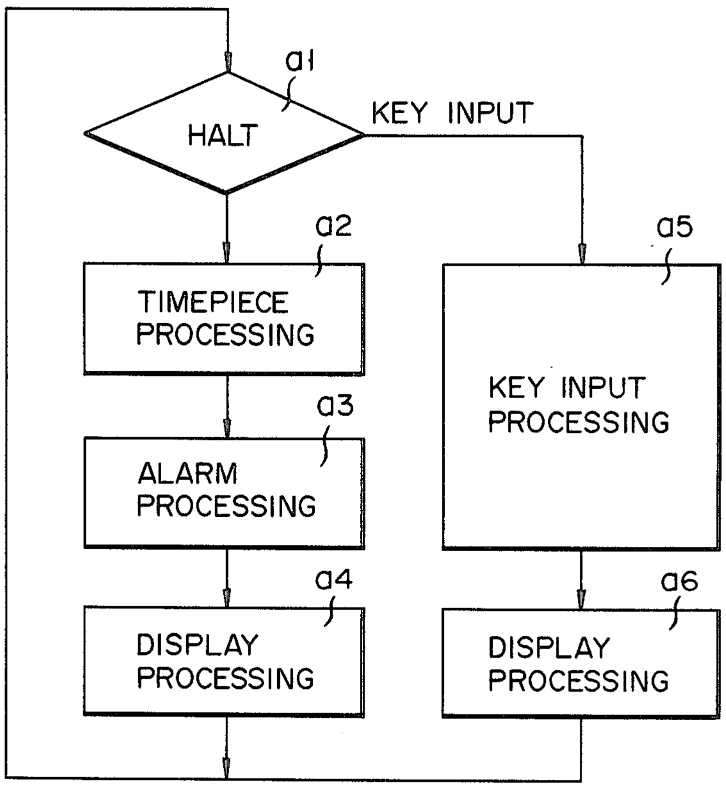
FIG. 14 is a general flow chart of the circuit shown in FIG. 10.

FIG. 14 is a general flow chart showing entire processing of this embodiment. Referring to FIG. 14, as long as there is no key input processing from a HALT state in step a1, timepiece processing in step a2, alarm processing in step a3 if necessary, and display processing in step a4 are executed at predetermined time intervals. When any key switch is operated to instruct key input processing, key input processing in step a5 and display processing in step a6 are executed.

Figure 15:
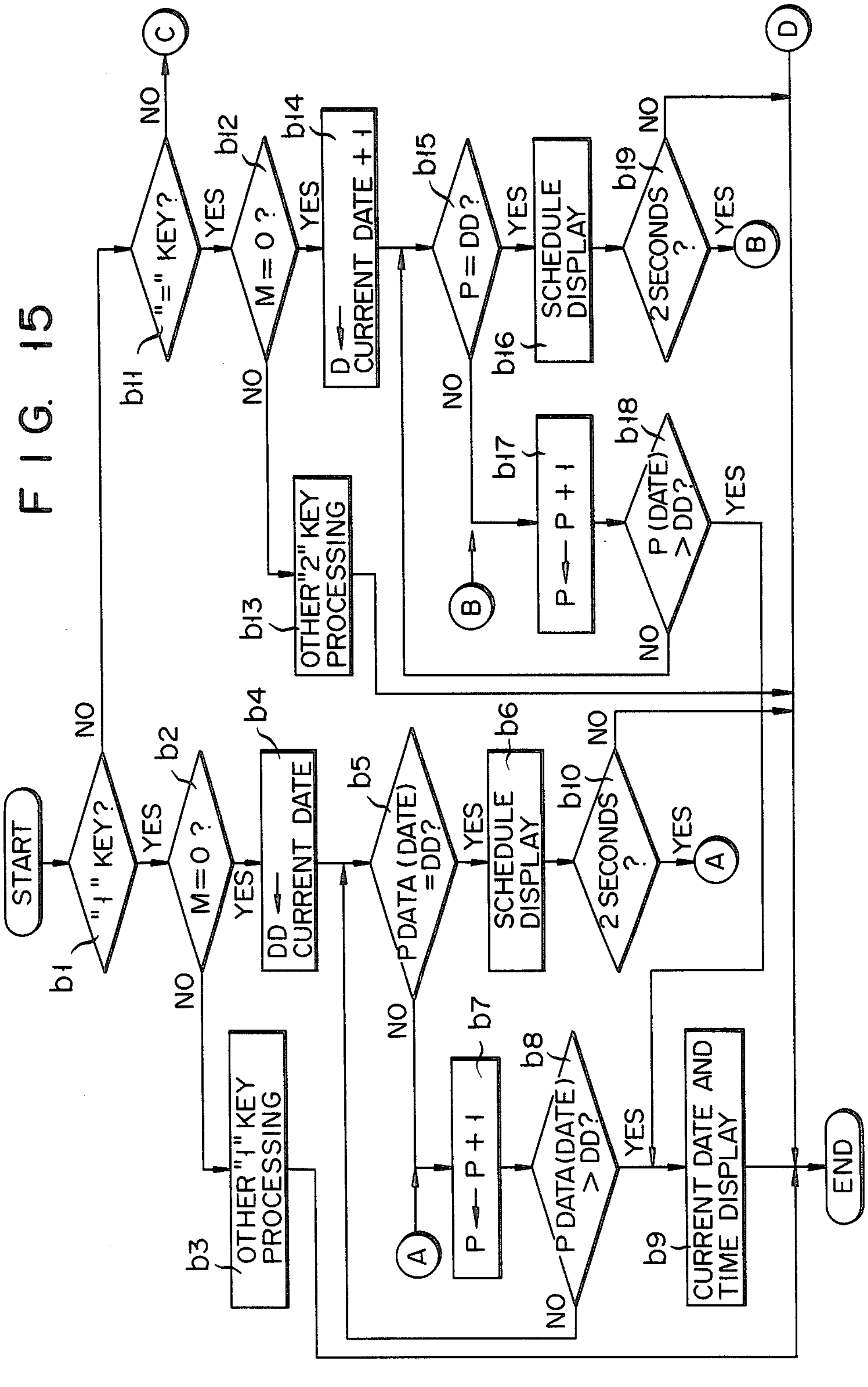
FIGS. 15 and 16 are detailed flow charts of switch processing shown in FIG. 14.
Figure 16:
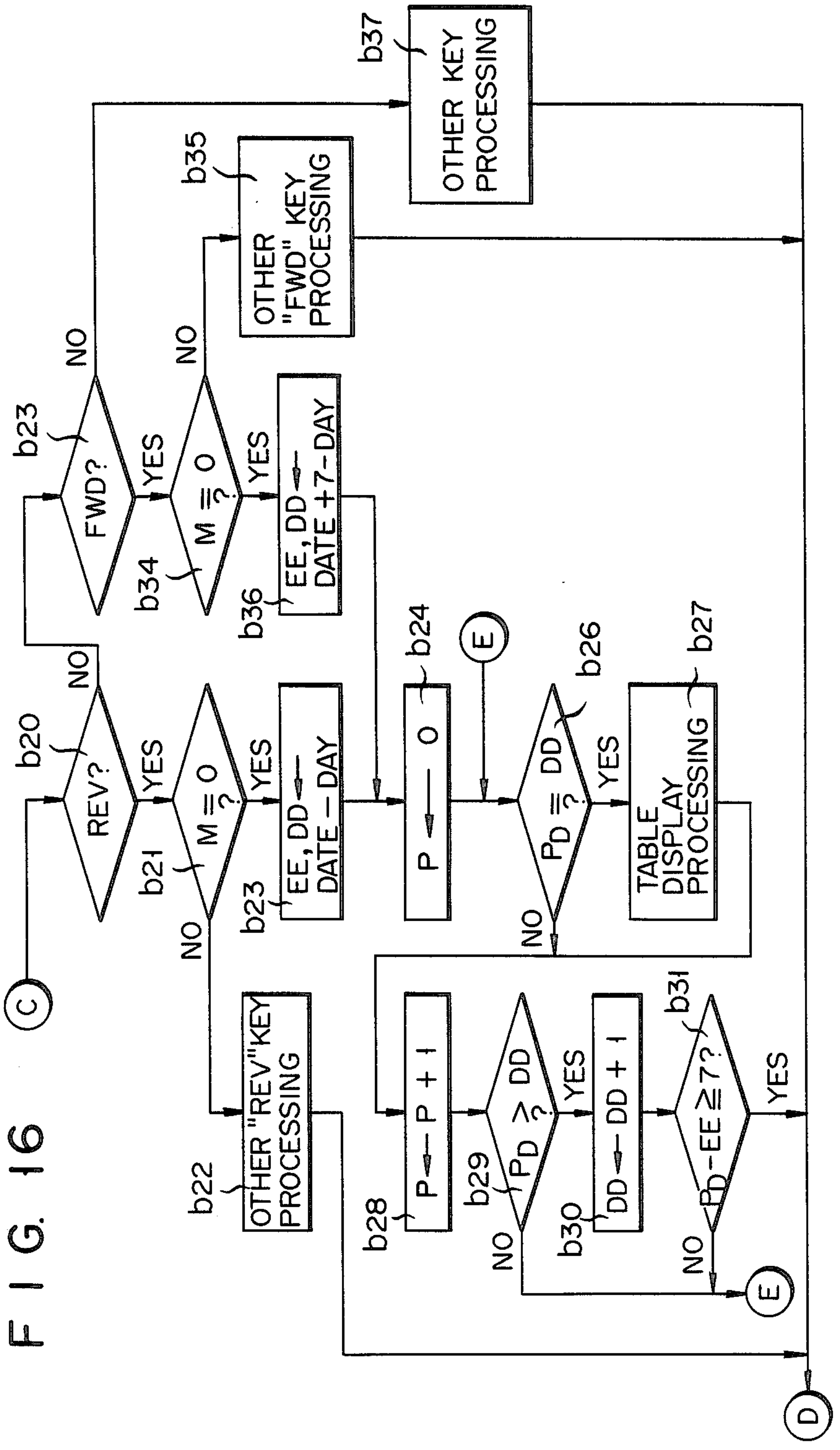

FIGS. 15 and 16 are detailed flow charts of the key input processing (step a5 in FIG. 14). It is checked in step b1 if the "1" key is operated. If YES in step b1, it is checked in step b2 if "0" is set in flag M, i.e., if the basic time display mode is set. If NO in step b2, other "1" key processing (processing in other menu display modes) is executed in step b3. If YES in step b2, current date data in time register 115 is transferred to date register DD, and is then compared with date data in a memory address specified by address pointer P. When a coincidence therebetween is found, schedule data in the memory address specified by address pointer P is displayed in step b6. This schedule display processing (step b6) is performed by sending display data to display buffer **200*a*. If it is detected in step b5 that data in date register DD does not coincide with that specified by address pointer P, address pointer P is incremented by 1 in step b7. It is checked in step b8 if data in date register DD is larger than that in a memory address specified by incremented address pointer P. If NO in step b8, the flow returns to step b5. However, if YES in step b8, the current time is displayed in step b9 and processing ends. After the schedule display processing (step b6), when two seconds have passed in step b10, the flow returns to step b7, and the same processing is repeated. More specifically, when there is more than one schedule data for a current date, these data are sequentially displayed each for two seconds. In the schedule display processing (step b6**), when secret data is present, its memo data is not displayed.

Next, if NO is step b1, i.e., if the "1" key is not operated, it is checked in step b11 if the "=" key is operated. If YES in step b11, it is checked in step b12 if "0" is set in flag M. If NO in step b12, other "=" key processing is performed in step b13. If YES in step b12, current date data is incremented by one (tomorrow's date) and is stored in date register DD, and it is then checked in step b15 if data in register DD is equal to date data in a memory address specified by address pointer P. Thereafter, the same processing as in steps b6, b7, b8, and b10 for displaying today's schedule data is performed for schedule display processing in step b16, processing in step b17 for incrementing address pointer P by one, comparison processing in step b18 of date register DD and address pointer P, and 2-sec comparison processing in step b19. More specifically, when there is more than one tomorrow's schedule data, these data are displayed each for two seconds.

Next, if NO in step b11, i.e., if the "=" key is not operated, it is checked in step b20 if switch "REV" is operated. If YES in step b20, it is checked in step b21 if "0" is set in flag M. If NO in step b21, other "REV" key processing is performed in step b22. However, if YES in step b21, the value of the current day register is subtracted from current date data and the difference is stored in date register DD. More specifically, since Sunday corresponds to "0" and Saturday corresponds to "6", when day data is subtracted from date data, date data on Sunday of this week can be obtained. In step b24, address pointer P is set to be "0". Next, it is checked in step b26 if data in date register DD is equal to that (PD) in a memory address specified by address pointer P. If YES in step b26, table display processing for schedule data in a memory address specified by address pointer P is performed in step b17, and address pointer P is incremented by 1 in step b28. However, if NO in step b25, the flow advances directly to step b28. It is checked in step b29 if data in register DD is smaller than data (PD) in a memory address specified by incremented address pointer P. If NO in step b29, the the value of register DD is incremented by 1 in step b30. Then, it is checked in step b31 if the difference obtained by subtracting the value of counter EE storing date data on Sunday from date data (PD) in a memory address specified by address pointer P is larger than 7. If YES in step b31, the flow ends. However, if NO in step b31, the flow returns to step b26. In this manner, in the above processing, schedule data from Sunday to Saturday for a week (this week) including a current date is displayed in the form of a table.

Next, if NO in step b20, i.e., if switch "REV" is not operated, it is checked in step b33 if switch "FWD" is operated. If YES in step b33, it is checked in step b34 if "0" is set in flag M. If NO in step b34, other key processing is performed in step b35. However, if YES in step b34, current date data is added to 7 and current day data is subtracted from the sum data (i.e., date on next Sunday), and the resultant difference data is stored in register EE and date register DD. Thereafter, the same processing as for displaying schedule data for this week is performed. More specifically, schedule data from Sunday to Saturday of the next week is displayed in the form of a table. Note that if NO in step b33, i.e., if switch "REV" is not operated, other key processing is performed in step b37.

In this manner, in the embodiment shown in FIGS. 9 to 16, detailed schedule data for today and tomorrow can be known using "1" and "=" keys, as well as schedule data for this week and the next week using "REV" and "FWD" keys.

Note that in the embodiments shown in FIGS. 1 to 8 and FIGS. 9 to 16, schedule data for a week is optically displayed on a liquid-crystal display device. However, the data can be printed out on paper sheets and the like using, e.g., a printer. In this case, date, time, and ruled line formats are prestored in, e.g., a ROM, and can be printed out at the same time when schedule data is printed.

In the above embodiments, a case has been exemplified wherein the present invention is applied to an electronic wristwatch. However, the apparatus of the present invention can be incorporated in other electronic equipment, e.g., compact, portable electronic equipment, such as a compact electronic calculator, IC card, and the like, and can be a special-purpose machine for displaying schedule data.

What is claimed is:

1. An electronic schedule display apparatus comprising:

key input means for inputting schedule data, the schedule data input by said key input means including date data, start time data, end time data, and content data of a scheduled event;

schedule data storage means, having a memory area capacity sufficient for storing the schedule data for a plurality of scheduled events input by said key input means in respective memory areas;

a matrix display device including a large number of optical matrix display elements arranged to correspond to a matrix table of days and times, one optical matrix display element of said matrix display device corresponding to several minutes, and one hour being constituted by the display elements smaller in number than 60; and display control means, connected to said schedule data storage means, for supplying drive signals to said matrix display device based on the date data, start time data and end time data of scheduled data for a particular scheduled event of said plurality of stored scheduled events to drive all display elements between one display element corresponding to the start time data and other display element corresponding to the end time data in a portion of the matrix display device corresponding to the date data.

2. An apparatus according to claim 1, wherein said key input means comprises an input section for inputting an alphanumeric character written manually, and recognition means for recognizing the character.

3. An apparatus according to claim 1, wherein said key input means comprises start time input means for inputting the start time data of the schedule data, and end time setting means for setting the end time data by correcting the start time data input by said start time input means.

4. An apparatus according to claim 3, wherein said end time setting means includes a touch key.

5. An apparatus according to claim 3, wherein said end time setting means includes a plurality of linearly arranged touch keys, and when the touch keys are touched with a finger, a setting operation is performed.

6. An apparatus according to claim 1, further comprising:

timepiece means for counting a reference signal to obtain time and date data; and current time display means for displaying current time data consisting of the time and date data obtained by said timepiece means.

7. An apparatus according to claim 1, wherein said matrix display device includes means for displaying schedule data for at least 12 hours of a day for the start and end time data of the schedule data stored in said schedule data storage means.

8. An apparatus according to claim 7, further comprising:

means for displaying the start and end time data excluded from the 12 hours of the schedule data stored in said schedule data storage means.

9. An apparatus according to claim 1, wherein said matrix display device is prepared 2 rows × 4 columns of the optical matrix display elements for each hour.

10. An apparatus according to claim 1, wherein said matrix display device is prepared 2 rows × a plurality of columns of the optical matrix display elements for each hour, the optical matrix display elements corresponding to the start and end time data being displayed in two rows, and the display elements therebetween are displayed in one row.

11. An apparatus according to claim 1, wherein said key input means comprises a key switch for inputting numeric data and character data.

12. An apparatus according to claim 1, wherein said key input means comprises a switch for displaying schedule data for this week on said matrix display device.

13. An apparatus according to claim 1, wherein said key input means comprises a switch for displaying schedule data for the next week on said matrix display device.

14. An electronic schedule display apparatus comprising:

timepiece means for counting a reference signal to obtain time and date data;

key input means for inputting schedule data, the schedule data input by said key input means including date data, start time data, end time data, and content data of a scheduled event;

schedule data storage means, having a memory area capacity sufficient for storing the schedule data for a plurality of scheduled events input by said key input means in respective memory areas;

a matrix display device including a large number of optical matrix display elements arranged to correspond to a matrix table of days and times, one optical matrix display element of said matrix display device corresponding to several minutes, and one hour being constituted by the display elements smaller in number than 60;

a schedule display switch means for displaying a schedule for a desired week on said matrix display device; and display control means connected to said schedule data storage means, said timepiece means, and said schedule display switch means, for converting the date data, start time data and end time data stored in said schedule data storage means for a plurality of scheduled events into respective drive signals, and supplying drive signals to said matrix display device for scheduled events within said desired week, based on the date data obtained from said timepiece means, to drive all the display elements between one display element corresponding to the start time data and another display element corresponding to the end time data for the respective scheduled events within said desired week in a portion of said matrix display device corresponding to the date data.

15. An apparatus according to claim 14, wherein said schedule display switch means for displaying schedule data for the desired week is a switch for displaying schedule data for this week, and said apparatus further comprises means for obtaining date data on Sunday of this week from the date data obtained by said timepiece means upon operation of said schedule display switch means, readout control means for reading out schedule data for 7 days from the date on Sunday obtained, and means for displaying the schedule data for this week on said matrix display device based on the schedule data read out by said readout control means.

16. An apparatus according to claim 14, wherein said schedule display switch means for displaying schedule data for the desired week is a switch for displaying schedule data for the next week, and said apparatus further comprises means for obtaining date data on Sunday of the next week from the date data obtained by said timepiece means upon operation of said schedule display switch means, readout control means for reading out schedule data for 7 days from the date on Sunday obtained, and means for displaying the schedule data for the next week on said matrix display device based on the schedule data read out by said readout control means.

* * * * *